United States Patent Office 3,135,659
Patented June 2, 1964

---

3,135,659
HYDROXY AND ALKOXY ARYL QUINAZOLINONES
Bola Vithal Shetty and Liborio A. Campanella, Rochester, N.Y., and Edwin E. Hays, Northridge, Calif., assignors to Wallace & Tiernan Inc., Belleville, N.J., a corporation of Delaware
No Drawing. Filed May 2, 1962, Ser. No. 191,726
9 Claims. (Cl. 167—65)

This invention relates to 5, 6, 7, and 8 hydroxy and alkoxy substituted 3-aryl-4-quinazolinones; and their acid and alkali addition salts.

The compounds of this invention alone or mixed with pharmaceutically acceptable carriers are particularly useful as central nervous system depressants, exhibiting muscle relaxant, anti-convulsant, and tranquilizing effects. However, they have various other uses such as being useful in the production of other quinazolinone derivatives useful in medical research, and in the production of dye intermediates.

The free bases of the compounds comprising this invention have the following general formula:

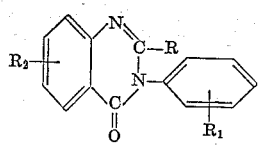

where

R=hydrogen, lower alkyl
$R_1$=hydrogen, lower alkyl and trifluoromethyl group
$R_2$=hydroxy, alkoxy The lower alkyl group may suitably be substituted in the ortho, para, or meta position of the 3-aryl group.

The hydroxy or alkoxy group may suitably be in the fifth, sixth, seventh, or eighth position. Particularly satisfactory results as tranquilizers and muscle relaxants have been obtained when the hydroxy or alkoxy is in the sixth position, the alkoxy is a methoxy group, and the aryl group is 3-o-tolyl or a 3-o-trifluoromethylphenyl.

Some examples of suitable pharmaceutically acceptable addition salts of the above free base with inorganic and organic acids are the hydrochloride, hydrobromide, hydroiodide, sulfate, phosphate, maleate, acetate, citrate, succinate, benzoate, glycolate, and others. These can be prepared by methods hereinafter described and well known to the art.

The cation exchange resinates which are complex acid addition salts can be prepared by agitating a suspension of a cation exchange resin such as a sulfonic cation exchange resin or a carboxylic acid cation exchange resin preferably in hydrogen form, with the quinazolinone base. A product is obtained wherein the cation of the quinazolinone compound replaces the hydrogen or other cation of the resin, thus forming an adsorption compound or resinate. This adsorption compound when administered to a patient is acted upon by the ions in the gastric and intestinal juices and undergoes an ion exchange reaction whereby the pharmaceutically acceptable salt such as the hydrochloride or the free base in solution is formed in the gastric intestinal tract. Where slow release of the quinazolinone compound from the resin is desired, the sulfonic acid cation exchange resin should be used to form the resinate.

The alkali addition salts can be prepared by reacting the free base with a potassium or sodium hydroxide so as to form the respective potassium or sodium salts wherein the potassium or sodium replaces the hydrogen of the hydroxy group.

The compounds of this invention may be administered alone but are generally administered with a pharmaceutical carrier, such as, for example, from 5 percent to 95 percent by weight of carrier. For example, they may be administered orally in the form of tablets or capsules containing such excipients as starch, clay, or the like, or in the form of elixir or oral suspension. This is true of the resinates as well as the free base and common salts. However, for parenteral and intramuscular administration the free base and common salts should be used.

The physician and veterinarian will determine the dosage which will be most suitable for the particular application; however, it has been found that limit doses between 10 and 400 mgs. for human patients are effective for producing the therapeutical result set forth above. These amounts are on the basis of the free base.

The following examples are illustrative of the methods of preparing the compounds of this invention:

EXAMPLE I

Preparation of 2-Methyl-3-(o-Tolyl)-6-Hydroxy-4-(3H)-Quinazolinone

SYNTHETIC SCHEME

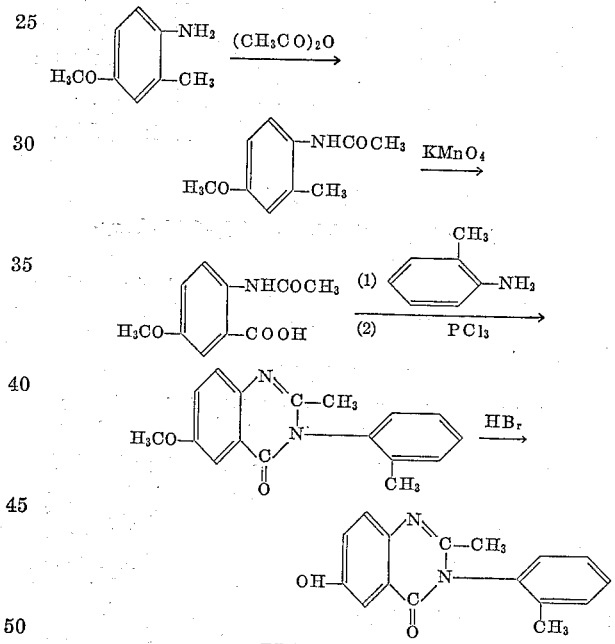

PROCEDURE

Step No. 1: One hundred grams (0.73 mole) of 2-methyl-1-4-methoxy aniline was added to a two liter beaker containing 1000 ml. of water and 50.0 gm. of ice. With vigorous stirring 100.0 gm. (1.0 mole) of acetic anhydride was added a few cc. at a time. After the addition was over, the stirring was continued for 0.5 hour. The solid product was removed by filtration and dried. M.P.=129–130° C. Wt.=125.0 gm. (96%).

Step No. 2: In a three liter, three-necked, round-bottomed flask, equipped with a stirrer and a thermometer, was placed 30.0 gm. (0.17 mole) of 2-methyl-4-methoxy-N-acetyl aniline, 100.0 gm. (0.63 mole) of potassium permanganate and 1000 ml. of water. The reaction mixture was stirred for one hour at room temperature and then 3 ml. of 5 percent sodium hydroxide solution was added dropwise, with stirring during 5 minutes. The stirring was continued for another hour when the temperature rose to 60° C. Stirring was continued for an additional 6 hours while the temperature was maintained at 60° C. with the external application of heat. The reaction mixture was filtered and acidified with a concentrated aqueous sodium bisulfite solution. The white solid was removed by filtration and dried. M.P.=158–60° C. Wt.=6.0 gm. (17%).

Step No. 3: In a three necked, three liter, round-bottomed flask provided with a stirrer, dropping funnel and a condenser protected from atmospheric moisture, were placed 20.8 gm. (0.1 mole) of N-acetyl-5-methoxy anthranilic acid, 800 ml. of toluene and 12.0 gm. (0.11 mole) of o-toluidine. With vigorous stirring, 4.5 gm. (0.031 mole) of phosphorous trichloride in 100 ml. of toluene was added dropwise during one hour. The reaction mixture was refluxed (gentle) with stirring for two hours. It was cooled below 30° C. and neutralized with a concentrated aqueous sodium carbonate solution. The toluene layer was separated and the aqueous layer was extracted with 100 ml. of toluene. The combined toluene solution was steam-distilled and the residue solidified on cooling. It was removed by filtration and recrystallized twice from absolute methanol. M.P.=164–5° C. Wt.=21.0 gm.

*Analysis.*—Calculated for $C_{17}H_{16}N_2O_2$: C, 72.69; H, 5.78; N, 9.92. Found: C, 72.83; H, 5.75; N, 10.00.

Step No. 4: Four grams of 2-methyl-3-(o-tolyl)-6-methoxy-4(3H)-quinazolinone was treated with 80 cc. of 48 percent hydrobromic acid and refluxed for 90 minutes. The reaction mixture was cooled to 5–10° C. and made alkaline with 5 percent sodium hydroxide solution. It was filtered and the filtrate was treated with dilute hydrochloric acid adjusting the pH to 6–7. The solid was collected, dried and recrystallized twice from absolute methanol. M.P.=269–70° C. Wt.=3.0 gm.

*Analysis.*—Calculated for $C_{16}H_{14}N_2O_2$: C, 72.29; H, 5.50; N, 10.61; —OH, 6.38. Found: C, 72.16; H, 5.30; N, 10.52; —OH, 6.39.

EXAMPLE II

*Preparation of 2-Methyl-3-(o-Tolyl)-6-Methoxy-4(3H)-Quinazolinone*

It will be noted that the above compound is the resulting product produced by Step No. 3 of the foregoing Example I.

EXAMPLE III

*2-Methyl-3-(o-Tolyl)-6-Methoxy-4(3H)-Quinazolinone Ionically Bound to a Sulphonic Cation Exchange Resin*

To 370 gms. of moist Amberlite IR–120 resin (225 gms. of dry resin) suspended in distilled water was added an amount of 2-methyl-3-(o-tolyl)-6-methoxy-4(3H)-quinazolinone sufficient to yield a product containing approximately 38 percent 2-methyl-3-(o-tolyl)-6-methoxy-4(3H)-quinazolinone. The mixture was stirred for two hours, filtered, and dried for fifteen hours at 60° C. The drug-resin complex was found to contain 39 percent 2-methyl-3-(o-tolyl)-6-methoxy-4(3H)-quinazolinone.

EXAMPLE IV

*Preparation of 2-Methyl-3-(o-Trifluoromethylphenyl)-6-Hydroxy-4(3H)-Quinazolinone*

SYNTHETIC SCHEME

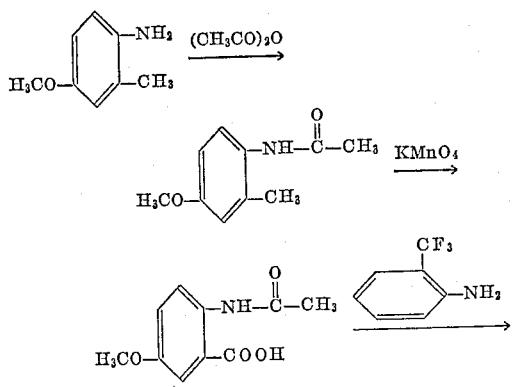

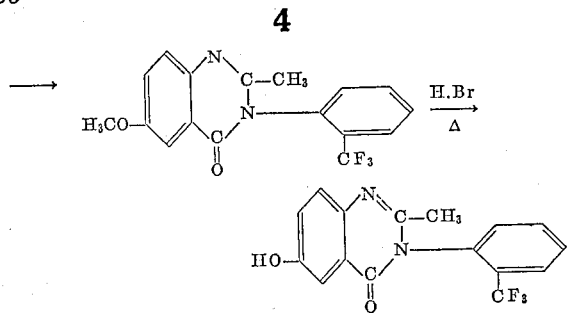

*Preparation of 2-Methyl-3-(o-Trifluoromethyl Phenyl)-6-Hydroxy-4(3H)-Quinazolinone*

Step No. 1:

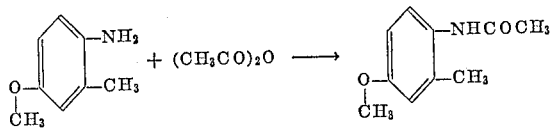

One hundred grams (0.73 mole) of 2-methyl-4-methoxy aniline was added to a 2 liter beaker containing 1 liter of water and 50 g. of ice. With vigorous stirring, 100 g. (1.0 mole) of acetic anhydride was added and continued stirring for 1 hour. The solid product was removed by filtration and dried. Wt.=108.5 g., M.P.=129–30° C.

Step No. 2:

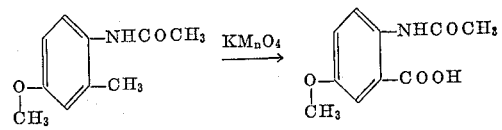

In a 5 liter, three necked round-bottomed flask equipped with a stirrer and thermometer, were placed 60.0 g. (0.33 mole) of 2-methyl-4-methoxy-N-acetyl aniline, 200.0 g. (1.26 moles) of potassium permanganate and 2 liter of water. The reaction mixture was stirred for 1 hour and then 10 ml. of 5 percent sodium hydroxide solution was added dropwise over a period of 3–5 minutes. During the addition, the temperature of the reaction mixture rose to 60° C. which was maintained for 2 hours by the external application of heat. It was allowed to stand overnight at room temperature, filtered and the filtrate, while cooling, was acidified with sulfur dioxide. The solid product was filtered off and dried. Wt.=8.9 g., M.P.=158–60° C.

Step No. 3:

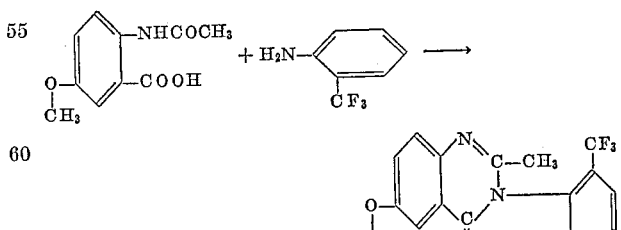

Nine grams (0.043 mole) of 5-methoxy-N-acetyl anthranilic acid, 7.0 g. (0.043 mole) of O-amino benzotrifluoride and 390 ml. of toluene were placed in a 1 liter three necked round-bottomed flask equipped with a stirrer, a condenser and a dropping funnel. With stirring, and cooling below 25° C., a solution of 3.5 g. (0.025 mole) of phosphorous trichloride, in 10 ml. toluene was added during a period of 1 hour. Then the reaction mixture was refluxed for 2 hours, cooled below 30° C. and neutralized with a saturated solution of sodium carbonate. The organic layer was separated, steam-distilled, cooled and the resulting solid was filtered off. It was recrystallized twice from methanol.

Analysis.—Calculated for $C_{17}H_{13}F_3N_2O_2$: C, 61.08; H, 4.05; N, 8.38; F, 17.05. Found: C, 61.31; H, 3.92; N, 8.02; F, 16.85.

Wt.=6.8 g., M.P.=188–9° C.

Step No. 4:

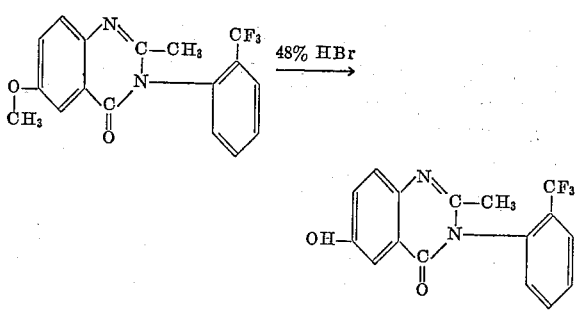

Three and one-half grams (0.01 mole) of 2-methyl-3-(o-trifluoromethyl phenyl)-6-methoxy-4(3H)-quinazolinone and 140 ml. of 48% hydrobromic acid were placed in a round-bottomed flask and refluxed for three hours. Then the reaction mixture was poured into 200 g. of ice and neutralized to pH 6 to 7. The solid product was filtered off and recrystallized twice from methanol.

Analysis.—Calculated for $C_{16}H_{11}F_3N_2O_2$: C, 59.94; H, 3.43; N, 8.74; F, 17.76; —OH, 5.31. Found: C, 59.71; H, 3.68; N, 8.38; F, 17.91; —OH, 5.27.

Wt.=2.0 g., M.P.=199–200° C.

EXAMPLE V

*Preparation of 2-Methyl-3-(o-Trifluoromethyl Phenyl)-6-Methoxy-4(3H)-Quinazolinone*

It will be noted that the above compound is the resulting product produced by Step No. 3 of the foregoing Example I.

EXAMPLE VI

*2-Methyl-3-(o-Trifluoromethyl Phenyl)-6-Methoxy-4(3H)-Quinazolinone Ionically Bound to a Sulphonic Cation Exchange Resin*

To 370 gms. of moist Amberlite IR-120 resin (225 gms. of dry resin) suspended in distilled water was added an amount of 2-methyl-3-(o-trifluoromethyl phenyl)-6-methoxy-4(3H)-quinazolinone sufficient to yield a product containing approximately 40 percent 2-methyl-3-(o-trifluoromethyl phenyl)-6-methoxy-4(3H)-quinazolinone. The mixture was stirred for two hours, filtered, and dried for fifteen hours at 60° C. The drug-resin complex was found to contain 41 percent 2-methyl-3-(o-trifluoromethyl phenyl)-6-methoxy-4(3H)-quinazolinone.

Following the same procedure, the other compounds disclosed herein can be adsorbed upon and ionically bound with sulphonic acid cation exchange resins or other cation exchange resins to produce the compositions of the present invention. Such drug-resin complexes may be administered to patients as prepared, or mixed with the usually acceptable excipients. Aqueous suspensions of the resin adsorption compositions can be made and are particularly adapted to be mixed with syrups, such as those made with glucose, sucrose, or glycerin, and thus administered to patients in liquid form.

Pharmacological tests on mice, rats, and dogs show that the compounds of this invention when orally administered to such animals are effective as tranquilizers and/or muscle relaxants.

The following gives some of the pharmacological data obtained by us on the compounds of this application:

PHARMACOLOGICAL DATA

| Compound | Maximal Electro-shock Seizure Test $PD_{50}$ [a], mg./kg. | Strychnine Antagonism Test $PD_{50}$ [a], mg./kg. | Hexobarbital Potentiation $ED_{50}$ [b], mg./kg. |
|---|---|---|---|
| Methaqualone | 72 (58–88) | 112 (84–149) | 84 (71–99) |
| 2-Methyl-3-(o-tolyl)-6-hydroxy-4(3H)-quinazolinone | | 65 (47–87) | 46 (28–76) |
| 2-Methyl-3-(o-trifluoromethyl phenyl)-6-hydroxy-4(3H)-quinazolinone | 100 (80–125) | 110 (103–118) | 125 (75–210) |
| 2-Methyl-3-(o-tolyl)-6-methoxy-4(3H)-quinazolinone | 219 (187–256) | 210 (176–250) | 275 (202–375) |
| 2-Methyl-3-(o-trifluoromethyl phenyl)-6-methoxy-4(3H)-quinazolinone | | >2,500 | 183 (120–278) |

[a] Dose which protects 50% of the animals (mice). Numbers in parentheses are 95% confidence limits.
[b] Dose which is effective in 50% of the animals (mice). Numbers in parentheses are 95% confidence limits.

While certain embodiments of the invention have been described, many modifications thereof may be made without departing from the spirit of the invention; and it is not wished to be limited to the detailed examples, formulas and proportions of ingredients herein set forth. It is desired to be limited only as required by the appended claims.

This application is a continuation in part of our co-pending applications, Serial Numbers 47,375 and 47,376, now abandoned, both filed August 4, 1960.

We claim:

1. A therapeutic composition in dosage unit form comprising a therapeutically effective and non-toxic amount in from 10 to 400 milligrams of 2-methyl-3-(o-tolyl)-6-methoxy-4(3H)-quinazolinone, and a pharmaceutically accepted carrier.

2. A therapeutic composition in dosage unit form comprising a therapeutically effective and non-toxic amount in from 10 to 400 milligrams of 2-methyl-3-(o-tolyl)-6-hydroxy-4(3H)-quinazolinone, and a pharmaceutically accepted carrier.

3. A therapeutic composition in dosage unit form comprising a therapeutically effective and non-toxic amount in from 10 to 400 milligrams of 2-methyl-3-(o-trifluoromethyl phenyl)-6-methoxy-4(3H)-quinazolinone and a pharmaceutically accepted carrier.

4. A therapeutic composition in dosage unit form comprising a therapeutically effective and non-toxic amount in from 10 to 400 milligrams of 2-methyl-3-(o-trifluoromethyl phenyl)-6-hydroxy-4(3H)-quinazolinone, and a pharmaceutically accepted carrier.

5. The method of inducing muscle relaxation in a mammal which comprises administering to the mammal a pharmaceutical composition comprising a member selected from the group consisting of a compound having the formula:

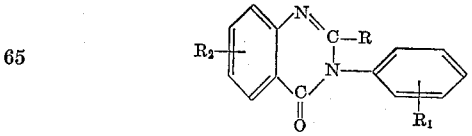

where R is a member selected from the group consisting of hydrogen and lower alkyl; $R_1$ is a member selected from the group consisting of hydrogen, lower alkyl, and trifluoromethyl, $R_2$ is selected from the group consisting of hydroxy and alkoxy, and their pharmaceutically acceptable acid addition salts.

6. The method of inducing central nervous system depression in a mammal which comprises administering to the mammal 2-methyl-3-(o-tolyl)-6-methoxy-4(3H)-quinazolinone.

7. The method of inducing central nervous system depression in a mammal which comprises administering to the mammal 2-methyl-3-(o-tolyl)-6-hydroxy-4(3H)-quinazolinone.

8. The method of inducing central nervous system depression in a mammal which comprises administering to the mammal 2-methyl-3-(o-trifluoromethyl phenyl)-6-methoxy-4(3H)-quinazolinone.

9. The method of inducing central nervous system depression in a mammal which comprises administering to the mammal 2-methyl-3-(o-trifluoromethyl phenyl)-6-hydroxy-4(3H)-quinazolinone.

References Cited in the file of this patent

UNITED STATES PATENTS

| | | |
|---|---|---|
| 1,880,447 | Hentrich et al. | Oct. 4, 1932 |
| 2,408,633 | Guenther et al. | Oct. 1, 1946 |
| 2,780,577 | Phillips et al. | Feb. 5, 1957 |
| 3,017,427 | Hamor | Jan. 16, 1962 |
| 3,020,202 | Seay | Feb. 6, 1962 |
| 3,023,221 | Szmuszkovicz | Feb. 27, 1962 |
| 3,036,128 | Moffett | May 22, 1962 |

OTHER REFERENCES

Iyer: Chem. Abst., vol. 53, page 21980, 1959.

Yale: J. of Medicinal and Pharm. Chem., vol 1, No. 2, pp. 121–133, 1959.